(12) United States Patent
Putman et al.

(10) Patent No.: US 12,153,668 B2
(45) Date of Patent: Nov. 26, 2024

(54) SECURING INDUSTRIAL PRODUCTION FROM SOPHISTICATED ATTACKS

(71) Applicant: Nanotronics Imaging, Inc., Cuyahoga Falls, OH (US)

(72) Inventors: Matthew C. Putman, Brooklyn, NY (US); Vadim Pinskiy, Wayne, NJ (US); Damas Limoge, Brooklyn, NY (US); Andrew Sundstrom, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 375 days.

(21) Appl. No.: 16/953,550

(22) Filed: Nov. 20, 2020

(65) Prior Publication Data

US 2021/0256116 A1    Aug. 19, 2021

Related U.S. Application Data

(60) Provisional application No. 62/938,158, filed on Nov. 20, 2019.

(51) Int. Cl.
*G06F 21/55* (2013.01)
*G06N 20/00* (2019.01)

(52) U.S. Cl.
CPC ........... *G06F 21/554* (2013.01); *G06N 20/00* (2019.01); *G06F 2221/034* (2013.01)

(58) Field of Classification Search
CPC .. G06F 21/554; G06F 2221/034; G06N 20/00
(Continued)

(56) References Cited

U.S. PATENT DOCUMENTS 4,056,716 A    11/1977  Baxter et al.
4,433,385 A    2/1984   De Gasperi et al.
(Continued)

FOREIGN PATENT DOCUMENTS

AU    2002359881 A1    7/2003
CN    1371489          9/2002
(Continued)

OTHER PUBLICATIONS

PCT International Application No. PCT/US20/61434, International Search Report and Written Opinion of the International Searching Authority, dated Feb. 22, 2021, 10 pages.
(Continued)

*Primary Examiner* — Dereena T Cattungal
(74) *Attorney, Agent, or Firm* — DLA PIPER LLP (US)

(57) ABSTRACT

A manufacturing system is disclosed herein. The manufacturing system includes one or more stations, a monitoring platform, and a control module. Each station of the one or more stations is configured to perform at least one step in a multi-step manufacturing process for a component. The monitoring platform is configured to monitor progression of the component throughout the multi-step manufacturing process. The control module is configured to detect a cyberattack to the manufacturing system. The control module is configured to perform operations. The operations include receiving control values for a first station of the one or more stations. The operations further include determining that there is a cyberattack based on the control values for the first station using one or more machine learning algorithms. The operations further include generating an alert to cease processing of the component. In some embodiments, the operations further include correcting errors caused by the cyberattack.

20 Claims, 6 Drawing Sheets

(58) Field of Classification Search
USPC ......................................................... 726/23
See application file for complete search history.

(56) References Cited

U.S. PATENT DOCUMENTS

| | | | |
|---|---|---|---|
| 5,027,295 | A | 6/1991 | Yotsuya |
| 5,808,432 | A | 9/1998 | Inoue et al. |
| 5,815,198 | A | 9/1998 | Vachtsevanos et al. |
| 6,240,633 | B1 | 6/2001 | Kent et al. |
| 6,266,436 | B1 | 7/2001 | Bett et al. |
| 6,650,779 | B2 | 11/2003 | Vachtesvanos et al. |
| 6,757,571 | B1 | 6/2004 | Toyama |
| 7,149,337 | B2 | 12/2006 | Michaelis et al. |
| 7,551,274 | B1 | 6/2009 | Wornson et al. |
| 8,185,217 | B2 | 5/2012 | Thiele |
| 8,612,043 | B2 | 12/2013 | Moyne et al. |
| 8,909,926 | B2 | 12/2014 | Brandt et al. |
| 9,945,264 | B2 | 4/2018 | Wichmann et al. |
| 9,977,425 | B1 | 5/2018 | McCann et al. |
| 10,061,300 | B1 | 8/2018 | Coffman et al. |
| 10,102,495 | B1 | 10/2018 | Zhang et al. |
| 10,481,579 | B1 | 11/2019 | Putman et al. |
| 11,117,328 | B2 | 9/2021 | Hough et al. |
| 11,156,982 | B2 | 10/2021 | Putman et al. |
| 11,156,991 | B2 | 10/2021 | Putman et al. |
| 11,156,992 | B2 | 10/2021 | Putman et al. |
| 11,209,795 | B2 | 12/2021 | Putman et al. |
| 11,675,330 | B2 | 6/2023 | Putman et al. |
| 11,703,824 | B2 | 7/2023 | Putman et al. |
| 2002/0002414 | A1 | 1/2002 | Hsiung et al. |
| 2002/0143417 | A1 | 10/2002 | Ito et al. |
| 2003/0061004 | A1 | 3/2003 | Discenzo |
| 2004/0030431 | A1 | 2/2004 | Popp et al. |
| 2004/0070509 | A1 | 4/2004 | Grace et al. |
| 2005/0267607 | A1 | 12/2005 | Paik |
| 2006/0013505 | A1 | 1/2006 | Yau et al. |
| 2006/0058898 | A1 | 3/2006 | Emigholz et al. |
| 2006/0149407 | A1 | 7/2006 | Markham et al. |
| 2007/0005525 | A1 | 1/2007 | Collette, III et al. |
| 2007/0036421 | A1 | 2/2007 | Toba et al. |
| 2007/0047797 | A1 | 3/2007 | Vilella |
| 2007/0177787 | A1 | 8/2007 | Maeda et al. |
| 2008/0100570 | A1 | 5/2008 | Friedrich et al. |
| 2008/0276128 | A1 | 11/2008 | Lin et al. |
| 2008/0300709 | A1 | 12/2008 | Collette, III et al. |
| 2009/0158577 | A1 | 6/2009 | Schweikle |
| 2009/0198464 | A1 | 8/2009 | Clarke et al. |
| 2009/0242513 | A1 | 10/2009 | Funk et al. |
| 2009/0281753 | A1 | 11/2009 | Noy |
| 2010/0106458 | A1 | 4/2010 | Leu et al. |
| 2010/0131202 | A1 | 5/2010 | Dannevik et al. |
| 2011/0141265 | A1 | 6/2011 | Holtkamp et al. |
| 2012/0151585 | A1 | 6/2012 | Lamastra et al. |
| 2012/0304007 | A1 | 11/2012 | Hanks et al. |
| 2013/0031037 | A1 | 1/2013 | Brandt et al. |
| 2013/0339919 | A1 | 12/2013 | Baseman et al. |
| 2014/0082730 | A1 | 3/2014 | Vashst et al. |
| 2014/0247347 | A1 | 9/2014 | McNeill et al. |
| 2014/0336785 | A1 | 11/2014 | Asenjo et al. |
| 2015/0045928 | A1 | 2/2015 | Perez et al. |
| 2015/0067844 | A1 | 3/2015 | Brandt et al. |
| 2015/0096022 | A1 | 4/2015 | Vincent et al. |
| 2015/0184549 | A1 | 7/2015 | Pamujula et al. |
| 2015/0185716 | A1 | 7/2015 | Wichmann et al. |
| 2015/0213369 | A1 | 7/2015 | Brandt et al. |
| 2015/0286202 | A1 | 10/2015 | Amano et al. |
| 2015/0324329 | A1 | 11/2015 | Blevins et al. |
| 2016/0170996 | A1 | 6/2016 | Frank et al. |
| 2016/0253618 | A1 | 9/2016 | Imazawa et al. |
| 2016/0259318 | A1 | 9/2016 | Vogt et al. |
| 2016/0261465 | A1 | 9/2016 | Gupta et al. |
| 2016/0300338 | A1 | 10/2016 | Zafar et al. |
| 2016/0330222 | A1 | 11/2016 | Brandt et al. |
| 2016/0352762 | A1 | 12/2016 | Friedlander et al. |
| 2017/0034205 | A1* | 2/2017 | Canedo ................. H04L 63/145 |
| 2017/0093897 | A1 | 3/2017 | Cochin et al. |
| 2017/0102694 | A1 | 4/2017 | Enver et al. |
| 2017/0102696 | A1 | 4/2017 | Bell et al. |
| 2017/0109646 | A1 | 4/2017 | David |
| 2017/0149820 | A1 | 5/2017 | Ruvio et al. |
| 2017/0156674 | A1 | 6/2017 | Hochman |
| 2017/0169219 | A1* | 6/2017 | Ogawa ............... G05B 19/0428 |
| 2017/0255723 | A1 | 9/2017 | Asenjo et al. |
| 2017/0264629 | A1* | 9/2017 | Wei ...................... G05B 19/058 |
| 2018/0005083 | A1 | 1/2018 | Georgescu et al. |
| 2018/0033130 | A1 | 2/2018 | Kimura et al. |
| 2018/0079125 | A1 | 3/2018 | Perez et al. |
| 2018/0114121 | A1 | 4/2018 | Rana et al. |
| 2018/0144248 | A1 | 5/2018 | Lu et al. |
| 2018/0150070 | A1 | 5/2018 | Johnson et al. |
| 2018/0157831 | A1* | 6/2018 | Abbaszadeh ......... G06F 21/552 |
| 2018/0165602 | A1 | 6/2018 | Van Seijen et al. |
| 2018/0180085 | A1 | 6/2018 | Watanabe et al. |
| 2018/0188704 | A1 | 7/2018 | Cella et al. |
| 2018/0188714 | A1 | 7/2018 | Cella et al. |
| 2018/0188715 | A1 | 7/2018 | Cella et al. |
| 2018/0210425 | A1 | 7/2018 | Cella et al. |
| 2018/0210426 | A1 | 7/2018 | Cella et al. |
| 2018/0210427 | A1 | 7/2018 | Cella et al. |
| 2018/0248905 | A1 | 8/2018 | Côté et al. |
| 2018/0253073 | A1 | 9/2018 | Cella et al. |
| 2018/0253074 | A1 | 9/2018 | Cella et al. |
| 2018/0253075 | A1 | 9/2018 | Cella et al. |
| 2018/0253082 | A1 | 9/2018 | Asenjo et al. |
| 2018/0255374 | A1 | 9/2018 | Cella et al. |
| 2018/0255375 | A1 | 9/2018 | Cella et al. |
| 2018/0255376 | A1 | 9/2018 | Cella et al. |
| 2018/0255377 | A1 | 9/2018 | Cella et al. |
| 2018/0255378 | A1 | 9/2018 | Cella et al. |
| 2018/0255379 | A1 | 9/2018 | Cella et al. |
| 2018/0255380 | A1 | 9/2018 | Cella et al. |
| 2018/0255381 | A1 | 9/2018 | Cella et al. |
| 2018/0255382 | A1 | 9/2018 | Cella et al. |
| 2018/0255383 | A1 | 9/2018 | Cella et al. |
| 2018/0262528 | A1 | 9/2018 | Jain |
| 2018/0276375 | A1 | 9/2018 | Arov et al. |
| 2018/0284735 | A1 | 10/2018 | Cella et al. |
| 2018/0284736 | A1 | 10/2018 | Cella et al. |
| 2018/0284737 | A1 | 10/2018 | Cella et al. |
| 2018/0284741 | A1 | 10/2018 | Cella et al. |
| 2018/0284742 | A1 | 10/2018 | Cella et al. |
| 2018/0284743 | A1 | 10/2018 | Cella et al. |
| 2018/0284744 | A1 | 10/2018 | Cella et al. |
| 2018/0284745 | A1 | 10/2018 | Cella et al. |
| 2018/0284746 | A1 | 10/2018 | Cella et al. |
| 2018/0284747 | A1 | 10/2018 | Cella et al. |
| 2018/0284749 | A1 | 10/2018 | Cella et al. |
| 2018/0284752 | A1 | 10/2018 | Cella et al. |
| 2018/0284753 | A1 | 10/2018 | Cella et al. |
| 2018/0284754 | A1 | 10/2018 | Cella et al. |
| 2018/0284755 | A1 | 10/2018 | Cella et al. |
| 2018/0284756 | A1 | 10/2018 | Cella et al. |
| 2018/0284757 | A1 | 10/2018 | Cella et al. |
| 2018/0284758 | A1 | 10/2018 | Cella et al. |
| 2018/0292811 | A1 | 10/2018 | Baseman et al. |
| 2018/0292812 | A1 | 10/2018 | Baseman et al. |
| 2018/0299878 | A1 | 10/2018 | Cella et al. |
| 2018/0316719 | A1* | 11/2018 | Schneider ........... H04L 63/1441 |
| 2018/0321666 | A1 | 11/2018 | Cella et al. |
| 2018/0321667 | A1* | 11/2018 | Cella ..................... G06N 3/047 |
| 2018/0321672 | A1 | 11/2018 | Cella et al. |
| 2018/0358271 | A1 | 12/2018 | David |
| 2018/0367550 | A1 | 12/2018 | Musuvathi et al. |
| 2018/0376067 | A1 | 12/2018 | Martineau |
| 2019/0020669 | A1 | 1/2019 | Glatfelter et al. |
| 2019/0025805 | A1 | 1/2019 | Cella et al. |
| 2019/0025806 | A1 | 1/2019 | Cella et al. |
| 2019/0025812 | A1 | 1/2019 | Cella et al. |
| 2019/0033845 | A1 | 1/2019 | Cella et al. |
| 2019/0033846 | A1 | 1/2019 | Cella et al. |
| 2019/0033847 | A1 | 1/2019 | Cella et al. |
| 2019/0033848 | A1 | 1/2019 | Cella et al. |
| 2019/0033849 | A1 | 1/2019 | Cella et al. |
| 2019/0041836 | A1 | 2/2019 | Cella et al. |

(56) References Cited

U.S. PATENT DOCUMENTS

| | | |
|---|---|---|
| 2019/0041840 A1 | 2/2019 | Cella et al. |
| 2019/0041841 A1 | 2/2019 | Cella et al. |
| 2019/0041843 A1 | 2/2019 | Cella et al. |
| 2019/0041844 A1 | 2/2019 | Cella et al. |
| 2019/0041845 A1 | 2/2019 | Cella et al. |
| 2019/0041846 A1 | 2/2019 | Cella et al. |
| 2019/0064766 A1 | 2/2019 | Friebolin et al. |
| 2019/0064792 A1 | 2/2019 | Cella et al. |
| 2019/0068618 A1 | 2/2019 | Mestha et al. |
| 2019/0068620 A1 | 2/2019 | Avrahami et al. |
| 2019/0072922 A1 | 3/2019 | Cella et al. |
| 2019/0072923 A1 | 3/2019 | Cella et al. |
| 2019/0072924 A1 | 3/2019 | Cella et al. |
| 2019/0072925 A1 | 3/2019 | Cella et al. |
| 2019/0072926 A1 | 3/2019 | Cella et al. |
| 2019/0072928 A1 | 3/2019 | Cella et al. |
| 2019/0073585 A1 | 3/2019 | Pu et al. |
| 2019/0079483 A1 | 3/2019 | Cella et al. |
| 2019/0089722 A1 | 3/2019 | Ciocarlie et al. |
| 2019/0094829 A1 | 3/2019 | Cella et al. |
| 2019/0094842 A1 | 3/2019 | Lee et al. |
| 2019/0094843 A1 | 3/2019 | Lee et al. |
| 2019/0104138 A1 | 4/2019 | Storms et al. |
| 2019/0107816 A1 | 4/2019 | Cella et al. |
| 2019/0114756 A1 | 4/2019 | Weiss et al. |
| 2019/0118300 A1 | 4/2019 | Penny et al. |
| 2019/0121339 A1 | 4/2019 | Cella et al. |
| 2019/0121340 A1 | 4/2019 | Cella et al. |
| 2019/0121342 A1 | 4/2019 | Cella et al. |
| 2019/0121343 A1 | 4/2019 | Cella et al. |
| 2019/0121344 A1 | 4/2019 | Cella et al. |
| 2019/0121345 A1 | 4/2019 | Cella et al. |
| 2019/0121346 A1 | 4/2019 | Cella et al. |
| 2019/0121347 A1 | 4/2019 | Cella et al. |
| 2019/0121349 A1 | 4/2019 | Cella et al. |
| 2019/0129404 A1 | 5/2019 | Cella et al. |
| 2019/0129405 A1 | 5/2019 | Cella et al. |
| 2019/0129406 A1 | 5/2019 | Cella et al. |
| 2019/0129408 A1 | 5/2019 | Cella et al. |
| 2019/0129409 A1 | 5/2019 | Cella et al. |
| 2019/0137985 A1 | 5/2019 | Cella et al. |
| 2019/0137987 A1 | 5/2019 | Cella et al. |
| 2019/0137988 A1 | 5/2019 | Cella et al. |
| 2019/0137989 A1 | 5/2019 | Cella et al. |
| 2019/0138897 A1 | 5/2019 | Xu et al. |
| 2019/0138932 A1 | 5/2019 | Akella et al. |
| 2019/0146474 A1 | 5/2019 | Cella et al. |
| 2019/0146476 A1 | 5/2019 | Cella et al. |
| 2019/0146477 A1 | 5/2019 | Cella et al. |
| 2019/0146481 A1 | 5/2019 | Cella et al. |
| 2019/0146482 A1 | 5/2019 | Cella et al. |
| 2019/0155272 A1 | 5/2019 | Cella et al. |
| 2019/0179277 A1 | 6/2019 | Cella et al. |
| 2019/0179278 A1 | 6/2019 | Cella et al. |
| 2019/0179279 A1 | 6/2019 | Cella et al. |
| 2019/0179300 A1 | 6/2019 | Cella et al. |
| 2019/0179301 A1 | 6/2019 | Cella et al. |
| 2019/0180153 A1 | 6/2019 | Buckler et al. |
| 2019/0187646 A1 | 6/2019 | Cella et al. |
| 2019/0187647 A1 | 6/2019 | Cella et al. |
| 2019/0187648 A1 | 6/2019 | Cella et al. |
| 2019/0187649 A1 | 6/2019 | Cella et al. |
| 2019/0187650 A1 | 6/2019 | Cella et al. |
| 2019/0187651 A1 | 6/2019 | Cella et al. |
| 2019/0187652 A1 | 6/2019 | Cella et al. |
| 2019/0187653 A1 | 6/2019 | Cella et al. |
| 2019/0187654 A1 | 6/2019 | Cella et al. |
| 2019/0187655 A1 | 6/2019 | Cella et al. |
| 2019/0187656 A1 | 6/2019 | Cella et al. |
| 2019/0187657 A1 | 6/2019 | Cella et al. |
| 2019/0187680 A1 | 6/2019 | Cella et al. |
| 2019/0187681 A1 | 6/2019 | Cella et al. |
| 2019/0187682 A1 | 6/2019 | Cella et al. |
| 2019/0187683 A1 | 6/2019 | Cella et al. |
| 2019/0187684 A1 | 6/2019 | Cella et al. |
| 2019/0187685 A1 | 6/2019 | Cella et al. |
| 2019/0187686 A1 | 6/2019 | Cella et al. |
| 2019/0187687 A1 | 6/2019 | Cella et al. |
| 2019/0187688 A1 | 6/2019 | Cella et al. |
| 2019/0187689 A1 | 6/2019 | Cella et al. |
| 2019/0187690 A1 | 6/2019 | Cella et al. |
| 2019/0197236 A1 | 6/2019 | Niculescu-Mizil et al. |
| 2019/0213099 A1 | 7/2019 | Schmidt et al. |
| 2019/0219995 A1 | 7/2019 | Cella et al. |
| 2019/0219996 A1 | 7/2019 | Cella et al. |
| 2019/0227536 A1 | 7/2019 | Cella et al. |
| 2019/0227537 A1 | 7/2019 | Cella et al. |
| 2019/0230099 A1* | 7/2019 | Mestha ............... H04L 63/1425 |
| 2019/0230106 A1 | 7/2019 | Abbaszadeh et al. |
| 2019/0235461 A1 | 8/2019 | Cella et al. |
| 2019/0235462 A1 | 8/2019 | Cella et al. |
| 2019/0238568 A1 | 8/2019 | Goswami et al. |
| 2019/0243323 A1 | 8/2019 | Cella et al. |
| 2019/0243346 A1 | 8/2019 | Baseman et al. |
| 2019/0286111 A1 | 9/2019 | Yennie et al. |
| 2019/0286892 A1 | 9/2019 | Li et al. |
| 2019/0294869 A1 | 9/2019 | Naphade et al. |
| 2019/0295887 A1 | 9/2019 | Trickett et al. |
| 2019/0295890 A1 | 9/2019 | Clark et al. |
| 2019/0295891 A1 | 9/2019 | Clark et al. |
| 2019/0295906 A1 | 9/2019 | Clark et al. |
| 2019/0299536 A1 | 10/2019 | Putman et al. |
| 2019/0302707 A1 | 10/2019 | Guo et al. |
| 2019/0339684 A1 | 11/2019 | Cella et al. |
| 2019/0339685 A1 | 11/2019 | Cella et al. |
| 2019/0339686 A1 | 11/2019 | Cella et al. |
| 2019/0339687 A1 | 11/2019 | Cella et al. |
| 2019/0362480 A1 | 11/2019 | Diao et al. |
| 2019/0379677 A1 | 12/2019 | Zenz et al. |
| 2019/0384250 A1 | 12/2019 | Cella et al. |
| 2019/0386595 A1 | 12/2019 | Fujita et al. |
| 2019/0391550 A1 | 12/2019 | Cella et al. |
| 2019/0391551 A1 | 12/2019 | Cella et al. |
| 2019/0391552 A1 | 12/2019 | Cella et al. |
| 2020/0012248 A1 | 1/2020 | Cella et al. |
| 2020/0013156 A1* | 1/2020 | Weiss ..................... G06F 18/40 |
| 2020/0019154 A1 | 1/2020 | Cella et al. |
| 2020/0019155 A1 | 1/2020 | Cella et al. |
| 2020/0026270 A1 | 1/2020 | Cella et al. |
| 2020/0076838 A1 | 3/2020 | Mestha et al. |
| 2020/0081423 A1 | 3/2020 | Clark et al. |
| 2020/0083070 A1 | 3/2020 | Clark et al. |
| 2020/0083074 A1 | 3/2020 | Clark et al. |
| 2020/0083080 A1 | 3/2020 | Clark et al. |
| 2020/0096986 A1 | 3/2020 | Cella et al. |
| 2020/0096987 A1 | 3/2020 | Cella et al. |
| 2020/0096988 A1 | 3/2020 | Cella et al. |
| 2020/0096989 A1 | 3/2020 | Cella et al. |
| 2020/0096990 A1 | 3/2020 | Cella et al. |
| 2020/0096992 A1 | 3/2020 | Cella et al. |
| 2020/0096993 A1 | 3/2020 | Cella et al. |
| 2020/0096994 A1 | 3/2020 | Cella et al. |
| 2020/0096995 A1 | 3/2020 | Cella et al. |
| 2020/0096996 A1 | 3/2020 | Cella et al. |
| 2020/0096997 A1 | 3/2020 | Cella et al. |
| 2020/0096998 A1 | 3/2020 | Cella et al. |
| 2020/0099707 A1* | 3/2020 | Abbaszadeh .......... G06N 20/00 |
| 2020/0103890 A1 | 4/2020 | Cella et al. |
| 2020/0103891 A1 | 4/2020 | Cella et al. |
| 2020/0103892 A1 | 4/2020 | Cella et al. |
| 2020/0103893 A1 | 4/2020 | Cella et al. |
| 2020/0110398 A1 | 4/2020 | Cella et al. |
| 2020/0110399 A1 | 4/2020 | Cella et al. |
| 2020/0110400 A1 | 4/2020 | Cella et al. |
| 2020/0110401 A1 | 4/2020 | Cella et al. |
| 2020/0111689 A1 | 4/2020 | Banna et al. |
| 2020/0117180 A1 | 4/2020 | Cella et al. |
| 2020/0125978 A1* | 4/2020 | Abbaszadeh ......... H04L 41/142 |
| 2020/0166909 A1 | 5/2020 | Noone et al. |
| 2020/0175171 A1 | 6/2020 | Rieger et al. |
| 2020/0310380 A1 | 10/2020 | Sun et al. |
| 2020/0314128 A1 | 10/2020 | Hild |
| 2020/0333777 A1 | 10/2020 | Maruyama |
| 2020/0401120 A1 | 12/2020 | Putman et al. |

(56) References Cited

U.S. PATENT DOCUMENTS

| | | |
|---|---|---|
| 2021/0069990 A1 | 3/2021 | Hough et al. |
| 2021/0118730 A1 | 4/2021 | Clark et al. |
| 2021/0125863 A1 | 4/2021 | Clark et al. |
| 2021/0132593 A1 | 5/2021 | Sundstrom et al. |
| 2021/0138735 A1 | 5/2021 | Limoge et al. |
| 2021/0168976 A1 | 6/2021 | Kawai et al. |
| 2021/0192779 A1 | 6/2021 | Putman et al. |
| 2021/0263495 A1 | 8/2021 | Putman et al. |
| 2021/0311440 A1 | 10/2021 | Sundstrom et al. |
| 2021/0378190 A1 | 12/2021 | Limoge et al. |
| 2021/0394456 A1 | 12/2021 | Hough et al. |
| 2022/0011727 A1 | 1/2022 | Hlavac et al. |
| 2022/0236709 A1 | 7/2022 | Cella et al. |
| 2022/0308653 A1 | 9/2022 | Pu et al. |
| 2023/0182235 A1 | 6/2023 | Penny et al. |

FOREIGN PATENT DOCUMENTS

| | | |
|---|---|---|
| CN | 1705938 | 12/2005 |
| CN | 101771702 | 7/2010 |
| CN | 102466566 A | 5/2012 |
| CN | 102778858 A | 11/2012 |
| CN | 103324175 | 9/2013 |
| CN | 104656602 A | 5/2015 |
| CN | 105094030 | 11/2015 |
| CN | 105264640 | 1/2016 |
| CN | 105488806 A | 4/2016 |
| CN | 105960777 | 9/2016 |
| CN | 106687981 | 5/2017 |
| CN | 106857797 | 6/2017 |
| CN | 106921676 A | 7/2017 |
| CN | 107389701 | 11/2017 |
| CN | 107835982 | 3/2018 |
| CN | 107851047 | 3/2018 |
| CN | 107886500 | 4/2018 |
| CN | 107976969 | 5/2018 |
| CN | 108353078 | 7/2018 |
| CN | 108475649 | 8/2018 |
| CN | 108604393 | 9/2018 |
| CN | 108780314 | 11/2018 |
| CN | 108885446 | 11/2018 |
| CN | 109167796 | 1/2019 |
| CN | 109561112 | 4/2019 |
| CN | 109766992 | 5/2019 |
| CN | 110381045 | 10/2019 |
| CN | 110431503 | 11/2019 |
| CN | 110647414 A | 1/2020 |
| CN | 110851834 A | 2/2020 |
| EP | 0671677 | 3/1999 |
| EP | 2585248 B1 | 10/2017 |
| EP | 4028228 A1 | 7/2022 |
| JP | 5-108126 | 4/1993 |
| JP | H05322789 | 12/1993 |
| JP | 2001100838 A | 4/2001 |
| JP | 2002230337 A | 8/2002 |
| JP | 2003167613 A | 6/2003 |
| JP | 2004104576 A | 4/2004 |
| JP | 2004178388 | 6/2004 |
| JP | 2005211105 A | 8/2005 |
| JP | 2005250990 A | 9/2005 |
| JP | 2007280366 A | 10/2007 |
| JP | 2008009868 A | 1/2008 |
| JP | 2008512792 A | 4/2008 |
| JP | 2008146621 A | 6/2008 |
| JP | 2009134623 A | 6/2009 |
| JP | 2009282740 | 12/2009 |
| JP | 4601492 | 12/2010 |
| JP | 4621773 | 1/2011 |
| JP | 20121235221 | 6/2012 |
| JP | 2015099022 A | 5/2015 |
| JP | 2015181024 A | 10/2015 |
| JP | 2016-157357 | 9/2016 |
| JP | 5984096 B2 | 9/2016 |
| JP | 2017091091 A | 5/2017 |
| JP | 6224873 B1 | 11/2017 |
| JP | 2017211713 A | 11/2017 |
| JP | 2018022210 A | 2/2018 |
| JP | 2018-103309 | 7/2018 |
| JP | 6356909 | 7/2018 |
| JP | 2018139101 A | 9/2018 |
| JP | 201961565 | 4/2019 |
| JP | 6527295 | 5/2019 |
| JP | 201995859 | 6/2019 |
| JP | 2019145042 A | 8/2019 |
| JP | 2020-035420 | 3/2020 |
| JP | 2020114597 A | 7/2020 |
| JP | 2021518674 | 8/2021 |
| JP | 2022522159 | 4/2022 |
| KR | 10-2011-0069934 | 6/2011 |
| KR | 10-2015-0075742 | 7/2015 |
| KR | 101568879 B1 | 11/2015 |
| KR | 10-2017-0127430 | 11/2017 |
| KR | 10-2019-0000182 | 1/2019 |
| TW | 454137 | 9/2001 |
| TW | 489443 | 6/2002 |
| TW | 200307972 | 12/2003 |
| TW | 200415453 | 8/2004 |
| TW | 200629117 | 8/2006 |
| TW | 200715080 A | 4/2007 |
| TW | 200724237 | 7/2007 |
| TW | 201212140 | 3/2012 |
| TW | I409658 | 9/2013 |
| TW | 201339069 A | 10/2013 |
| TW | 201717144 | 5/2017 |
| TW | 201723914 | 7/2017 |
| TW | 201809640 A | 3/2018 |
| TW | 201816717 | 5/2018 |
| TW | 201839626 A | 11/2018 |
| TW | 201842403 A | 12/2018 |
| TW | 201908896 | 3/2019 |
| TW | 201939634 A | 10/2019 |
| TW | 201941194 A | 10/2019 |
| TW | 201941328 A | 10/2019 |
| TW | 202001678 A | 1/2020 |
| WO | 03/060812 | 7/2003 |
| WO | 2005093535 A3 | 11/2005 |
| WO | 2018044410 A1 | 3/2018 |
| WO | 2018055754 A1 | 3/2018 |
| WO | 2018061842 A1 | 4/2018 |
| WO | 2018062398 A1 | 4/2018 |
| WO | 2018105296 | 6/2018 |
| WO | 2018217903 | 11/2018 |
| WO | 2019012653 A1 | 1/2019 |
| WO | 2019058532 A1 | 3/2019 |
| WO | 2019/182913 | 9/2019 |
| WO | 2019195039 A1 | 10/2019 |

OTHER PUBLICATIONS

Office Action and Search Report from Taiwan Patent Application No. 111130991, dated May 17, 2023, 12 pages.

Office Action for Japanese Patent Application No. 2021575060, dated Jun. 2, 2023, 7 pages.

Office Action for Japanese Patent Application No. 2022520885, dated Jun. 30, 2023, 10 Pages.

Office Action for Japanese Patent Application No. 2022529027, dated Jun. 30, 2023, 5 pages.

Zhong R.Y., et al, "Intelligent Manufacturing in the Context of Industry 4.0: A Review," Engineering, Mar. 31, 2017, vol. 3, No. 5, pp. 616-630.

Zhou C., et al., "Anomaly Detection with Robust Deep Autoencoders," Proceedings of the 23rd ACM SIGKDD International Conference on Knowledge Discovery and Data Mining, Aug. 13-17, 2017, pp. 665-674.

American Society for Quality: "What is Statistical Process Control?," 2021, 07 Pages, [Retrieved on Jul. 23, 2019], Retrieved from URL: https://asq.org/quality-resources/statistical-process-control.

An J., etal, "Variational Autoencoder Based Anomaly Detection Using Reconstruction Probability," Special Lecture on IE 2.1,Dec. 27, 2015, pp. 1-18.

(56) References Cited

OTHER PUBLICATIONS

Bose A., et al., "Behavioral Detection of Malware on Mobile Handsets," MobiSys, Proceedings of the 6th International Conference on Mobile Systems, Applications, and Services, Jun. 17-20, 2008, pp. 225-238.
Evangelidis G.D., et al., "Parametric Image Alignment Using Enhanced Correlation Coefficient Maximization," IEEE Transactions on Pattern Analysis and Machine Intelligence, Oct. 2008, vol. 30, No. 10, pp. 1-8.
Extended European Search Report for European Application No. 19916905.3, dated Sep. 9, 2022, 10 Pages.
Extended European Search Report for European Application No. 20156940.7, dated Aug. 10, 2020, 12 Pages.
Extended European Search Report for European Application No. 20763956.8, dated Sep. 9, 2022, 11 Pages.
Extended European Search Report for European Application No. 20832713.0, dated Jan. 3, 2023, 10 Pages.
Fujimoto S., et al., "Addressing Function Approximation Error in Actor-critic Methods," Proceedings of the 35th International Conference on Machine Learning Research, Oct. 22, 2018, 15 Pages.
Goodfellow I.J., et al., "Generative Adversarial Nets," Proceedings of Advances in Neural Information Processing Systems, 2014, 9 Pages.
International Preliminary Report on Patentability for International Application No. PCT/US2019/053746, dated Sep. 10, 2021, 6 Pages.
International Preliminary Report on Patentability for International Application No. PCT/US2020/029022, dated Sep. 10, 2021, 6 Pages.
International Preliminary Report on Patentability for International Application No. PCT/US2020/039064, dated Jan. 6, 2022, 7 Pages.
International Preliminary Report on Patentability for International Application No. PCT/US2020/052254, dated Apr. 21, 2022, 7 Pages.
International Preliminary Report on Patentability for International Application No. PCT/US2020/059339, dated May 19, 2022, 13 Pages.
International Preliminary Report on Patentability for International Application No. PCT/US2020/061434, dated Jun. 2, 2022, 09 Pages.
International Preliminary Report on Patentability for International Application No. PCT/US2021/019857, dated Sep. 9, 2022, 14 Pages.
International Preliminary Report on Patentability for International Application No. PCT/US2021/021440, dated Sep. 22, 2022, 09 Pages.
International Search Report and Written Opinion for International Application No. PCT/US2019/053746, dated Nov. 5, 2019, 7 Pages.
International Search Report and Written Opinion for International Application No. PCT/US2020/029022, dated Jul. 9, 2020, 08 Pages.
International Search Report and Written Opinion for International Application No. PCT/US2020/039064, dated Jul. 30, 2020, 8 Pages.
International Search Report and Written Opinion for International Application No. PCT/US2020/052254, dated Jan. 12, 2021, 8 Pages.
International Search Report and Written Opinion for International Application No. PCT/US2020/059339, dated Feb. 5, 2021, 14 Pages.
International Search Report and Written Opinion for International Application No. PCT/US2021/019857, dated May 7, 2021, 15 Pages.
International Search Report and Written Opinion for International Application No. PCT/US2021/021440, dated May 20, 2021, 10 Pages.
International Search Report and Written Opinion for International Application No. PCT/US2021/038085, dated Sep. 29, 2021, 14 Pages.
Karnouskos S., "Stuxnet Worm Impact on Industrial Cyber-Physical System Security," IECON, 37th Annual Conference of the IEEE Industrial Electronics Society, IEEE, 2011, 5 Pages.
Kingma D.P., et al., "Adam: A Method for Stochastic Optimization," arXiv preprint arXiv:1412.6980, ICLR 2015, Jan. 30, 2017, 15 pages.
Lardinois F., "Nvidia's Researchers Teach a Robot to Perform Simple Tasks by Observing a Human," 6 Pages, [Retrieved on Mar. 11, 2019], Retrieved from URL: https://techcrunch.com/2018/05/20/nvidias-researchers-teach-a-robot-to-learn-simple-tasks-by-observing-a-human/?utm_source=tcfbpage&utm_medium=feed&utm_campaign=Feed%3A+Techcrunch+%28TechCrunch%29&sr_share=facebook.
Lillicrap T.P., et al, Continuous Control With Deep Reinforcement Learning, Published as a Conference Paper at ICLR 2016, arXiv: 1509.02971v6 [cs.LG], Last Revised on Jul. 5, 2019, 14 Pages.
Liu H., et al., "Intelligent Tuning Method of Pid Parameters Based on Iterative Learning Control for Atomic Force Microscopy," Science Direct Micron, 2018, vol. 104, pp. 26-36.
Malhotra P., et al., "LSTM-Based Encoder-Decoder for Multi-Sensor Anomaly Detection," arXiv preprint arXiv: 1607.00148, Last Revised on Jul. 11, 2016, 5 pages.
Mnih V., et al., "Playing Atari With Deep Reinforcement Learning," arXiv preprint arXiv: 1312.5602v1, Dec. 19, 2013, 9 pages.
Mueller F., et al., "Real-time Hand Tracking under Occlusion from an Egocentric RGB-D Sensor," Max-Planck—Institute for Informatics, Germany, Universidad Rey Juan Carlos, Spain, Oct. 5, 2017, 16 Pages.
Ng A., "Sparse Autoencoder," CS294A Lecture Notes 72.2011, 2011, pp. 1-19.
Office Action and Search Report from Taiwan Patent Application No. 108137373, dated Mar. 31, 2023, 16 pages.
Office Action for European Patent Application No. 20156940.7, dated Feb. 10, 2023, 6 Pages.
Office Action for Japanese Patent Application No. 2021-549835, dated Mar. 3, 2023, 7 Pages.
Papanastasiou S., et al., "Bridging the Gap between Physical Layer Emulation and Network Simulation," IEEE Wireless Communication and Networking Conference, Date of Conference: Apr. 18-21, 2010, 06 pages.
Probabilistic Robotics; Sebastian Thrun et al.; 1999-2000.
Purdue University: "Intrusion Alert: System Uses Machine Learning, Curiosity-Driven 'Honeypots' to Stop Cyber Attackers," Research Foundation News, Feb. 6, 2020, 06 Pages, Retrieved From URL: https://engineering.purdue.edu/ECE/News/2020/intrusion-alert-system-uses-machine-learning-curiosity-driven-honeypots-to-stop-cyber-attackers.
Real R., et al., "The Probabilistic Basis of Jaccard's Index of Similarity," Systematic Biology, 1996, vol. 45, No. 3, pp. 380-385.
Sakurada M., et al., "Anomaly Detection Using Autoencoders With Nonlinear Dimensionality Reduction," Proceedings of the Machine Learning for Sensory Data Analysis (MLSDA) 2nd Workshop on Machine Learning for Sensory Data Analysis, 2014, 8 Pages.
Saunders J.A., et al., "Visual Feedback Control of Hand Movements," The Journal of Neuroscience, Mar. 31, 2004, vol. 24, No. 13, pp. 3223-3234.
Simon T., et al., "Hand Keypoint Detection in Single Images Using Multiview Bootstrapping," Proceedings of the IEEE conference on Computer Vision and Pattern Recognition, 2017, pp. 1145-1153.
SPC for Excel: "Control Chart Rules and Interpretation," BPI Consulting, LLC, Mar. 2016, 20 Pages, [Retrieved on Jul. 23, 2019], Retrieved From URL: https://www.spcforexcel.com/knowledge/control-chart-basics/control-chart-rules-interpretation.
SPC for Excel: "Interpreting Control Charts," BPI Consulting, LLC, Apr. 2004, 9 Pages, [Retrieved on Jul. 23, 2019], Retrieved From URL: https://www.spcforexcel.com/knowledge/control-charts-basics/interpreting-control-charts.
Szkilnyk G., "Vision Based Fault Detection in Assembly Automation," Queen's University, Jun. 2012, 219 Pages.
Vecerik M., et al., "Leveraging Demonstrations for Deep Reinforcement Learning on Robotics Problems with Sparse Rewards," arXiv preprint, arXiv:1707.08817, Submitted on Jul. 27, 2017, 10 Pages, Last revised on Oct. 8, 2018.
Office Action for Japanese Patent Application No. 2022-553668, dated Sep. 1, 2023, 9 Pages.

(56) References Cited

OTHER PUBLICATIONS

Supplementary European Search Report for European Patent Application No. 21760563.3, dated Jul. 18, 2023, 12 Pages.
Vollmer, et al., "Cyber-physical system security with deceptive virtual hosts for industrial control networks," IEEE Transactions on Industrial Informatics 10.2, May 2014, pp. 1337-1347.
Notice of Allowance for Japanese Patent Application No. 2021-549835, dated Jan. 5, 2024, 3 Page.
Office Action for Japanese Patent Application No. 2022577143, dated Jan. 12, 2024, 7 pages.
Office Action for Chinese Patent Application No. 202080044987.0, dated Jan. 29, 2024, 7 pages.
Extended Search Report from European Patent Application No. 20874557.0, dated Oct. 19, 2023, 12 Pages.
Potluri, et al., "Deep learning based efficient anomaly detection for securing process control systems against injection attacks," 2019 IEEE 15th International Conference on Automation Science and Engineering (CASE), 2019, pp. 854-860.
Erba, et al., "Real-time evasion attacks with physical constraints on deep learning-based anomaly detectors in industrial control systems," arXiv preprint arXiv:1907.07487, 2019, 15 pages.
Notification of Reason for Refusal from Korean Patent Application No. 10-2021-7030695, dated Dec. 18, 2023, 13 Pages.
Office Action for Chinese Patent Application No. 202080016336.0, dated Feb. 1, 2024, 8 pages.
Office Action for Japanese Patent Application No. 2022-553668, dated Feb. 9, 2024, 9 pages.
Office Action for Japanese Patent Application No. 2021549835, dated Sep. 22, 2023, 7 pages.
Office Action for Japanese Patent Application No. 2021575060, dated Oct. 13, 2023, 3 pages.
Office Action for Japanese Patent Application No. 2022529027, dated Oct. 13, 2023, 3 pages.
Office Action from Taiwan Patent Application No. 11221224400, dated Dec. 6, 2023, 18 pages.
Office Action from Indian Patent Application No. 202217044168, dated Nov. 30, 2023, 10 pages.
Office Action for Japanese Patent Application No. 2022-551360, dated Nov. 2, 2023, 4 pages.
Office Action for Japanese Patent Application No. 2022-207136, dated Nov. 24, 2023, 6 pages.
Office Action for TW Patent Application No. 11221179860, dated Nov. 27, 2023, 10 pages.
Office Action and Search Report from Taiwan Patent Application No. 112103333, dated Aug. 21, 2023, 8 Pages.
Notice of Allowance for Taiwanese Patent Application No. 108137373, dated Oct. 12, 2023, 4 pages.
Office Action for Chinese Patent Application No. 202080073852.7, dated Nov. 1, 2023, 4 pages.
Office Action for Japanese Patent Application No. 2022-520885, dated Nov. 2, 2023, 5 pages.
Office Action from Chinese Patent Application No. 201980092196.2, dated Feb. 29, 2024, 12 pages.
Notice of Allowance for Korean Patent Application No. 10-2021-7039615, mailed Feb. 27, 2024, 8 pages.
Extended European Search Report for European Application No. 20885424.0 dated Jan. 5, 2024, 12 pages.
Extended European Search Report for European Application No. 20889594.6 dated Nov. 27, 2023, 87 pages.
Notice of Allowance from Japanese Patent Application No. 2022-551360, dated Feb. 16, 2024, 3 pages.
Office Action from KR Patent Application No. 10-2021-7030700, dated Mar. 19, 2024, 16 pages.
Notice of Allowance for JP Patent Application No. 2022-520885, mailed Mar. 29, 2024, 3 pages.
Tang, et al., "HonIDS: Enhancing honeypot system with intrusion detection models, " Fourth IEEE International Workshop on Information Assurance (IWIA'06), IEEE, 2006.
Notice of Allowance for TW Patent Application No. 111130991, mailed Mar. 4, 2024, 4 pages.
Office Action from KR Patent Application No. 10-2022-7014934, dated Mar. 21, 2024, 15 pages.
Office Action from Chinese Patent Application No. 202080073852.7, dated Apr. 19, 2024, 15 pages.
Office Action from Chinese Patent Application No. 202180014828.0, dated Apr. 28, 2024, 8 pages.
Office Action from TW Patent Application No. 112103333, dated May 2, 2024, 3 pages.
Notice of Allowance from Taiwan Patent Application No. 112113077, dated May 14, 2024, 6 pages.
Office Action for European Patent Application No. 21767468.8, mailed Mar. 22, 2024, 12 Pages.
Office Action from Taiwan Patent Application No. 111108232, dated May 30, 2024, 8 pages.
Notice of Allowance from Japan Patent Application No. 2022-577143, dated May 31, 2024, 2 pages.
Office Action from Chinese Patent Application No. 202080079163.7, dated Jun. 4, 2024, 10 pages.
Office Action from India Patent Application No. 202318013498, dated May 31, 2024, 7 pages.
Office Action for Japanese Patent Application No. 2023-116653, mailed Jul. 12, 2024, 6 pages.
Notice of Allowance for TW Patent Application No. 109121636, mailed Jul. 9, 2024, 4 pages.
Office Action for Japanese Patent Application No. 2022-207136, mailed Jul. 26, 2024, 6 pages.
Office Action for Korean Patent Application No. 10-2022-7032975, mailed Jul. 20, 2024, 16 pages.
Office Action for Korean Patent Application No. 10-2021-7030695, mailed Jul. 12, 2024, 6 pages.
Office Action for Japanese Patent Application No. 2023-192266, mailed Aug. 9, 2024, 9 pages.
Notice of Allowance for Chinese Patent Application No. 202080044987.0, mailed Aug. 20, 2024, 4 pages.
Office Action for EP Patent Application No. 19916905.3, mailed May 28, 2024, 7 pages.
Office Action for EP Patent Application No. 20763956.8, mailed May 28, 2024, 7 pages.
Office Action for Japanese Patent Application No. 2023-192140, mailed Sep. 13, 2024, 8 pages.
Office Action for Chinese Patent Application No. 202080071010.8, mailed Oct. 9, 2024, 9 pages.

* cited by examiner

SECURING INDUSTRIAL PRODUCTION FROM SOPHISTICATED ATTACKS

CROSS-REFERENCE TO RELATED APPLICATIONS

This application claims priority to U.S. Provisional Application Ser. No. 62/938,158, filed Nov. 20, 2019, which is hereby incorporated by reference in its entireties.

FIELD OF DISCLOSURE

The present disclosure generally relates to a system, method, and media for manufacturing processes.

BACKGROUND

The past several decades of cyberattacks have witnessed a startling degree of proliferation, adaptation, specificity, and sophistication. Industrial and military security is the study of walls, physical and digital, which limit malicious insertion or removal of information. For high-security factories and military installations, this means creating systems that are removed from the global computer network and often removed from internal networks.

SUMMARY

In some embodiments, a manufacturing system is disclosed herein. The manufacturing system includes one or more stations, a monitoring platform, and a control module. Each station of the one or more stations is configured to perform at least one step in a multi-step manufacturing process for a component. The monitoring platform is configured to monitor progression of the component throughout the multi-step manufacturing process. The control module is configured to detect a cyberattack to the manufacturing system, the control module configured to perform operations. The operations include receiving control values for a first station of the one or more stations. The control values include attributes of the first processing station. The operations further include determining that there is a cyberattack based on the control values for the first station using one or more machine learning algorithms. The operations further include, based on the determining, generating an alert to cease processing of the component.

In some embodiments, a computer-implemented method is disclosed herein. A computing system receives control values for a first station of one or more stations of a manufacturing system configured to process a component. The control values include attributes of the first station. The computing system determines that there is a cyberattack based on the control values for the first station using one or more machine learning algorithms. The computing system generates an alert to cease processing of the component, based on the determining. The computing system generates a set of actions to correct for errors caused by the cyberattack. The set of actions is associated with downstream stations of the manufacturing system.

In some embodiments, a manufacturing system is disclosed herein. The manufacturing system includes one or more stations, a monitoring platform, and a control module. Each station of the one or more stations is configured to perform at least one step in a multi-step manufacturing process for a component. The monitoring platform is configured to monitor progression of the component throughout the multi-step manufacturing process. The control module is configured to detect a cyberattack to the manufacturing system, the control module configured to perform operations. The operations include receiving control values for a first station of the one or more stations. The control values include attributes of the first station. The operations further included determining that there is a cyberattack based on the control values for the first station using one or more machine learning algorithms. The operations further include generating an alert to cease processing of the component, based on the determining. The operations further include generating, using one or more second machine learning algorithms, a set of actions to correct for errors caused by the cyberattack. The set of actions is associated with downstream stations of the manufacturing system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
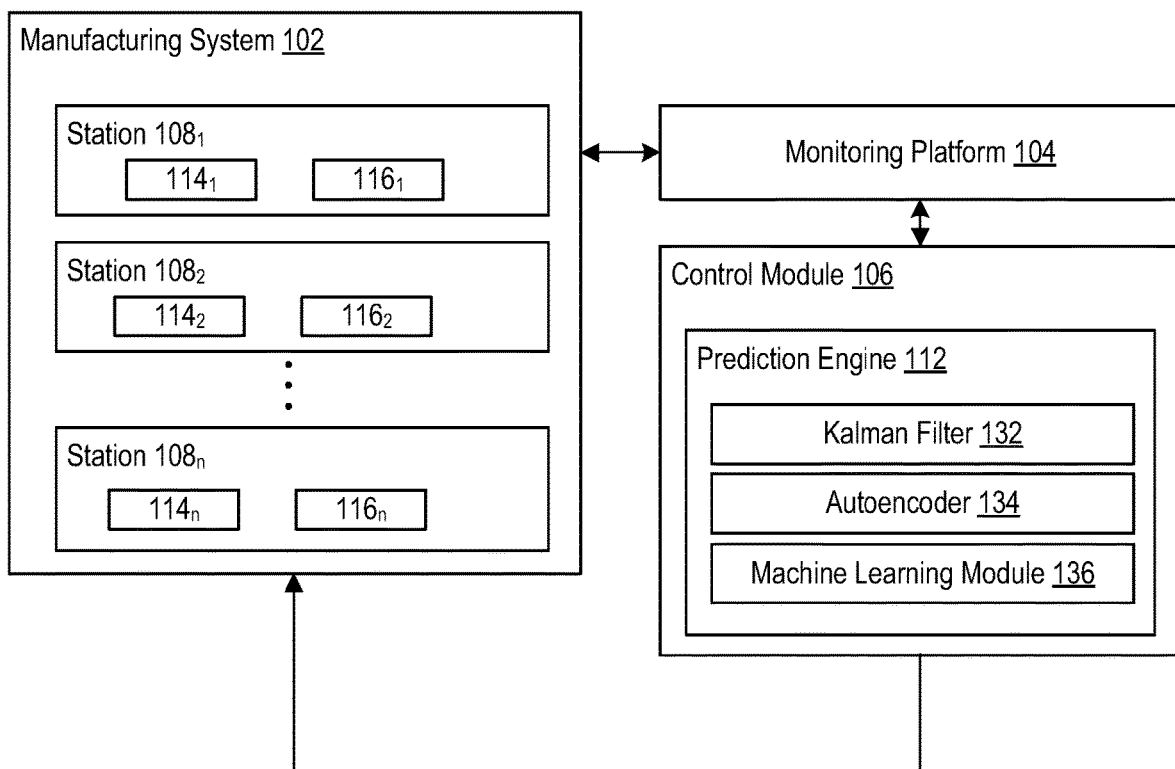
FIG. 1 is a block diagram illustrating a manufacturing environment, according to example embodiments.

Manufacturing processes may be complex and include raw materials being processed by different process stations (or "stations") until a final product is produced. In some embodiments, each process station receives an input for processing and may output an intermediate output that may be passed along to a subsequent (downstream) process station for additional processing. In some embodiments, a final process station may receive an input for processing and may output the final product or, more generally, the final output.

In some embodiments, each station may include one or more tools/equipment that may perform a set of process steps. Exemplary process stations may include, but are not limited to, conveyor belts, injection molding presses, cutting machines, die stamping machines, extruders, computer numerical control (CNC) mills, grinders, assembly stations, three-dimensional printers, quality control stations, validation stations, and the like.

In some embodiments, operations of each process station may be governed by one or more process controllers. In some embodiments, each process station may include one or more process controllers that may be programmed to control the operation of the process station. In some embodiments, an operator, or control algorithms, may provide the station controller with station controller setpoints that may represent the desired value, or range of values, for each control value. In some embodiments, values used for feedback or feed forward in a manufacturing process may be referred to as control values. Exemplary control values may include, but are not limited to: speed, temperature, pressure, vacuum, rotation, current, voltage, power, viscosity, materials/resources used at the station, throughput rate, outage time, noxious fumes, pH, light absorption, particle density, and geometric conformation, and the like.

Statistical process control (SPC) is a method of quality control which employs statistical methods to monitor and control a process. Generally, SPC calls for process standards to be established for each step in a manufacturing process and monitored throughout the production life cycle. The goal of SPC is to continuously improve the process through the life cycle.

For purpose of SPC, it is assumed that, as long as each node is operating within specification, the final product will also be within specification. The specifications may be set based on subject matter expertise and historical performance. The dependability and impact of one node onto the next or subsequent nodes is not directly adjusted in SPC; instead, each sub-process may be examined as an independent entity. This approach leads to wider margins for the operating condition of each node, preventing the system from even operating in the absolute highest efficiency or stability. From a security perspective, this margin may be targeted by sophisticated process cyberattacks. If a single node or several nodes in a system start to operate at the upper bounds (or lower bounds) of their specification, individual alarms will not be triggered, but the overall process quality will be affected. This especially holds for man-in-the-middle cyberattacks, where reported sensor signals, for example, are faked by the malicious code. The life cycle of the node will also be affected, thus requiring increased downtime for repair. Several layers of downstream nodes will also be affected and, over time, the continual drift of the system will tend toward non-compliance. By that point, the correction needed to recover the system would be massive and cost prohibitive.

One or more techniques provided herein are directed to a novel approach to industrial security by treating suspect malicious activity as a process variation and correcting it by actively tuning the operating parameters of the system. As threats to industrial systems increase in number and sophistication, conventional security methods need to be overlaid with advances in process control to reinforce the system as a whole.

FIG. 1 is a block diagram illustrating a manufacturing environment 100, according to example embodiments. Manufacturing environment 100 may include a manufacturing system 102, a monitoring platform 104, and a control module 106. Manufacturing system 102 may be broadly representative of a multi-step manufacturing system. In some embodiments, manufacturing system 102 may be representative of an assembly line system, where each processing station may be representative of a human worker. In some embodiments, manufacturing system 102 may be representative of a manufacturing system for use in additive manufacturing (e.g., 3D printing system). In some embodiments, manufacturing system 102 may be representative of a manufacturing system for use in subtractive manufacturing (e.g., CNC machining). In some embodiments, manufacturing system 102 may be representative of a manufacturing system for use in a combination of additive manufacturing and subtractive manufacturing. More generally, in some embodiments, manufacturing system 102 may be representative of a manufacturing system for use in a general manufacturing process.

Manufacturing system 102 may include one or more stations $108_1$-$108_n$ (generally, "station 108"). Each station 108 may be representative of a step and/or station in a multi-step manufacturing process. For example, each station 108 may be representative of a layer deposition operation in a 3D printing process (e.g., station $108_1$ may correspond to layer 1, station $108_2$ may correspond to layer 2, etc.). In another example, each station 108 may correspond to a specific processing station. In another example, each station 108 may correspond to a specific human operator performing a specific task in an assembly line manufacturing process.

Each station 108 may include a process controller 114 and control logic 116. Each process controller $114_1$-$114_n$ may be programmed to control the operation of each respective station 108. In some embodiments, control module 106 may provide each process controller 114 with station controller setpoints that may represent the desired value, or range of values, for each control value. Control logic 116 may refer to the attributes/parameters associated with a station's 108 process steps. In operation, control logic 116 for each station 108 may be dynamically updated throughout the manufacturing process by control module 106, depending on a current trajectory of a final quality metric.

Monitoring platform 104 may be configured to monitor each station 108 of manufacturing system 102. In some embodiments, monitoring platform 104 may be a component of manufacturing system 102. For example, monitoring platform 104 may be a component of a 3D printing system. In some embodiments, monitoring platform 104 may be independent of manufacturing system 102. For example, monitoring platform 104 may be retrofit onto an existing manufacturing system 102. In some embodiments, monitoring platform 104 may be representative of an imaging device configured to capture an image of a product or tooling (e.g., a worker or a process tool) at each step of a multi-step process. For example, monitoring platform 104 may be configured to capture an image of the component at each station 108 and/or an image of a component developing the product at each station 108 (e.g., tooling, human, etc.). Generally, monitoring platform 104 may be configured to capture information associated with production of a product (e.g., an image, a voltage reading, a speed reading, etc.) and/or tool (e.g., hand position, tooling position, etc.), and provide that information, as input, to control module 106 for evaluation.

Control module 106 may be in communication with manufacturing system 102 and monitoring platform 104 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN.

Control module 106 may be configured to control each process controller of manufacturing system 102. For example, based on information captured by monitoring platform 104, control module 106 may be configured to adjust process controls associated with a specific station 108. In some embodiments, control module 106 may be configured to adjust process controls of a specific station 108 based on a projected final quality metric.

As discussed above, conventional approaches to detecting process attacks various SPC techniques. SPC is a static, non-interventional approach to process control, where well-defined statistical properties are passively observed to pass or fail at each node. It is only after the last node's processing that these conventional systems make a decision as to whether to keep or discard the manufactured product.

To improve upon conventional processes, control module 106 includes error detection module 130. Error detection module 130 may be configured to detect an error at a given station 108 or node of manufacturing system 102. For example, error detection module 130 used as part of a dynamic, interventional approach to process control, where each node subsequent to the node causing detected damage is woven into an optimization problem (e.g., a damage recovery problem) and actively controlled to instantiate a solution to it. In some embodiments, this process may be done in real-time or near real-time, and while each cycle is ongoing, rather than at the end of a given cycle.

To understand the one or more techniques implemented by error detection module 130, it is important to understand how control module 106 defines a manufacturing system (e.g., manufacturing system 102). A manufacturing system may be defined using a wide variety of topological schemes, including feedback and feedforward organization. In some embodiments, a manufacturing system, F, may be defined as a linear sequence of n process nodes (or stations 108), labeled 1, . . . , N, connected in a feed forward-linked chain. For example:

$$F: \to 1 \to 2 \to \ldots \to i \to \ldots \to n$$

Similarly, in some embodiments, a manufacturing system, F, may be defined as a non-linear sequence of n process nodes (or stations 108), labeled 1, . . . , N. In some embodiments, the processing done by each node i may have two attributed distributions: an expected distribution, $Q_i$; and an observed distribution, $P_i$. $Q_i$ may be characterized by $\mu_{Q_i}$ and $\sigma_{Q_i}$. If $Q_i = N(\mu_{Q_i}, \sigma_{Q_i}^2)$, then $Q_i$ may be completely characterized. $P_i$ may be characterized by $\mu_{P_i}$ and $\sigma_{P_i}$. If $P_i = N(\mu_{P_i}, \sigma_{P_i}^2)$, then $P_i$ may be completely characterized.

In some embodiments, the damage caused by node i may be defined as the Kullback-Leibler divergence of $P_i$ with respect to $Q_i$:

$$d_i = D_{KL}(P_i \| Q_i) = \sum_{x \in X} P_i(x) \log\left(\frac{P_i(x)}{Q_i(x)}\right)$$

In some embodiments, the damage may be cumulative, or additive across F. For example:

$$d_f = \sum_{i=1}^{n} d_i$$

Referring back to error detection module 130, error detection module 130 may be configured to detect damage or an error at a given node, k of manufacturing system 102. For example, if error detection module 130 detects node k has caused damage (i.e., has produced a damaged or distorted distribution), then error detection module 130 may employ a control strategy that samples from $P_k$ and generates all subsequent resulting distributions flowing from it, $P_{k+1}, \ldots, P_n$, such that the remaining cumulative damage, $d_{k+1}, \ldots, d_k$, may be reduced or minimized. Accordingly, the damage recovery problem for error detection module 130 may be formulated as:

$$\operatorname*{argmin}_{\{P_{k+1}, \ldots, P_n\}} \left\{ \sum_{i=k+1}^{n} D_{KL}(P_i \| Q_i) \right\}$$

In some embodiments, error detection module 130 may implement one or more techniques to identify or correct damage detected at a given node. In some embodiments, error detection module 130 may use a Kalman Filter 132 to detect damage or errors at a given processing node. In some embodiments, error detection module 130 may include an autoencoder 134 to detect damage or errors at a given processing node. In some embodiments, error detection module 130 may use machine learning module 136 deep reinforcement learning techniques to detect damage or errors at a given processing node and correct detected variations caused by the damage or errors at downstream nodes or stations 108. In some embodiments, error detection module 130 may use one or more of Kalman Filter 132, an autoencoder 134, or machine learning module 136 to detect damage or errors at a given processing node and/or correct detected variations caused by the damage or errors at downstream nodes or stations 108.

In some embodiments, error detection module 130 may implement Kalman Filter 132 to detect errors at a processing node. To generalize the distribution description from above, i.e., $d_i$, a single input, single-output system may be established in state-space form as:

$$\dot{\vec{x}}_i = A_i \vec{x}_i + B_i u_{\varepsilon, i}(t)$$

$$y_i(t) = C_i^T \vec{x}_i$$

for $\vec{x}_i$ defined as arbitrary states of the system, y defined as the output of the system, and A, B, C may be system matrices defining the ordinary differential equation of the underlying dynamics. The input of this system, $u_\varepsilon$, may be a noisy input signal defined by:

$$u_{\varepsilon, i} = u_i(t) + \varepsilon_t$$

where $\varepsilon_t$ may be the additive noise contributed by $\varepsilon_t \sim \mathcal{N}(\mu_{\varepsilon, i}, R_i)$. In some embodiments, the observed output, $y_v$, may be a function of the system output as:

$$y_{v, i} = y_i(t) + \mathcal{V}_t$$

for a similarly noisy signal measurement, with $\dot{\vec{x}}_{t, i} \sim \mathcal{N}(\mu_{v, i}, \sigma_{v, i}^2)$. In some embodiments, this notation may be reconciled by establishing that $y_{v, i} \sim Q_i$ for a given node, i, of a process. In an unaffected system, the mean of the noise contributions may be zero, such that $\mu_{\varepsilon, i} = \mu_{v, i} = 0$. In a malicious cyberattack, however, the deviation may manifest as a non-zero mean input noise.

Generally, a Kalman Filter 132 may be reliant on zero mean noise; however, in the case of a malicious cyberattack, an offset of an input instruction may manifest as a non-zero mean additive noise. As such, a Kalman Filter 132 may be construed for the presumed time-invariant system of:

$$\dot{\vec{x}}_t = A_i \vec{x}_t + B_i u_{c,i}(t)$$

$$y_i(t) = C_i^T \vec{x}_i$$

In some embodiments, Kalman Filter 132 may be constructed using measurements of output, $y_{v,i}(t)$ for a node or a process, and the canonical, untouched input instruction $u_i(t)$. If the process is correctly calibrated, the input/output sensor measurements of a station 108 or node should have zero mean noise. However, in the case of a malicious cyberattack, there would be a non-zero bias.

In some embodiments, Kalman Filter 132 may be construed as:

$$\hat{\vec{x}}_{i,k} = A_i \hat{\vec{x}}_{i,k-1} + B_i u_{i,k}$$

$$\Sigma_{i,k} = A_i \Sigma_{i,k-1} A_i^T + R_i$$

$$K_{i,k} = \Sigma_{i,k} C_i (C_i^T \Sigma_{i,k} C_i + \sigma_{v,i}^2)^{-1}$$

$$\hat{\vec{x}}_{i,k} = \hat{\vec{x}}_{i,k} + K_{i,k}(y_{v,i,k} - C_i^T \hat{\vec{x}}_{i,k})$$

$$\Sigma_{i,k} = (I - K_{i,k} C_i^T) \Sigma_{i,k}$$

for the $k^{th}$ sample of a process node, i, where $\hat{\cdot}$ may be the measurement update notation, $\Sigma_{i,k}$ may be the covariance of the state prediction, $R_i$ may be the covariance of the input noise, $\varepsilon_i$, and $K_{i,k}$ may be the Kalman gains. With a large enough sample, the innovation distribution $\tilde{y}_{i,k} = y_{v,i,k} - C_i^T \hat{\vec{x}}_{i,k}$ should be $\tilde{y}_{i,k} \sim \mathcal{N}(\mu_{\tilde{y},i,k}=0, C_i^T \Sigma_{i,k|k-1} C_i)$. However, with a malicious cyberattack, $\mu_{\tilde{y},i,k} \neq 0$, but this may occur naturally within minimal samples. Once a sample threshold may be met, $k > k_{min}$, an alarm may be established for $\tilde{y}_{i,k} > \gamma_i$, where $\gamma_i$ may be tuned for a process node. If the innovation error is non-zero and above the threshold $\gamma_i$, then error detection module 130 may determine that a malicious cyberattack may be occurring FIG. 2 is a block diagram illustrating architecture of a single-input, single-output system (hereinafter "system 200") implementing Kalman Filter 132, according to example embodiments.

As shown, system 200 may include a controller 202 (e.g., C(s)), a plant 204 (e.g., G(s)), a measurement 206 (e.g., H(s)), an attack 208 (e.g., A(s)), and Kalman Filter 132 (e.g., KF). In some embodiments, system 200 may include a second controller 202. In some embodiments, controller 202, plant 204, and measurement 206 may represent the basic constituents of the nodal control, while Kalman Filter 132 produced an innovation error.

Figure 2:
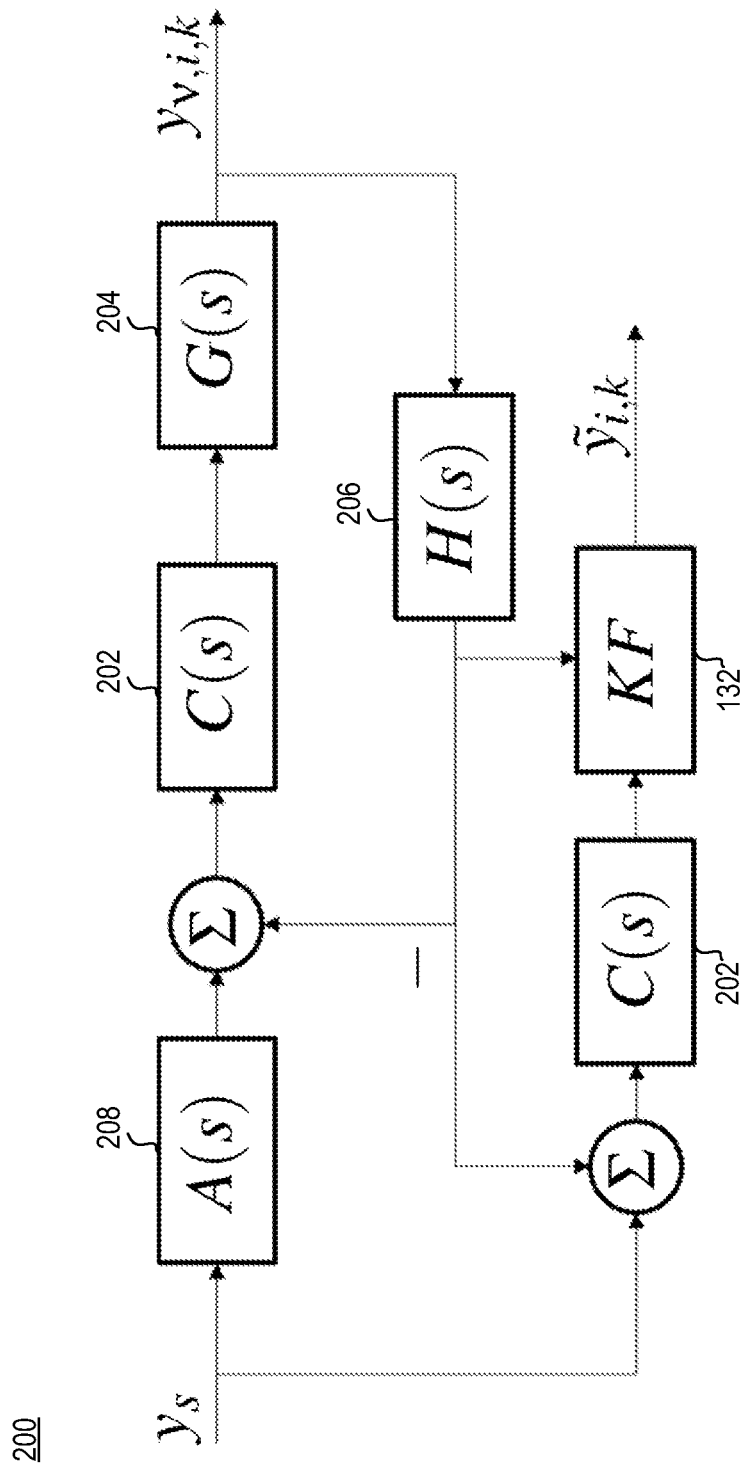
FIG. 2 is a block diagram illustrating architecture of a single-input, single-output system implementing Kalman Filter, according to example embodiments.

In some embodiments, such as that shown in FIG. 2, a twin controller may be used as an unbiased reference for Kalman Filter 132.

Referring back to FIG. 1, in some embodiments, error detection module 130 may use an autoencoder 134 to detect anomalies corresponding to a cyberattack. For a sequence of measured outputs, $\vec{y}_{v,i}$, an unsupervised autoencoder training can be instantiated to map an entropy of output observation on to a parameter set, $\theta_{AE}$, such that $$\hat{\vec{y}}_{v,i} = f(\vec{y}_{v,i}, \theta_{AE})$$

In some embodiments, the error of autoencoder 134 may be defined as:

$$\tilde{\vec{y}}_{v,i} = \vec{y}_{v,i} - \hat{\vec{y}}_{v,i}$$

and for a normal operation of, $\tilde{\vec{y}}_{v,i} \sim \mathcal{N}(\mu_{\tilde{y},i}, \Sigma_{\tilde{y},i})$, where $\mu_{\tilde{y}}$ and $\Sigma_{\tilde{y},i}$ may be fit to the distribution using maximum likelihood. Subsequently, an anomaly score, $a_i$, for a sequence may be defined as:

$$a_i = \mathcal{A}(\tilde{\vec{y}}_{V,i}, \mu_{\tilde{y},i}, \Sigma_{\tilde{y},i}) = (\tilde{\vec{y}}_{V,i} - \mu_{\tilde{y},i})^T \Sigma_{\tilde{y},i}^{-1} (\tilde{\vec{y}}_{V,i} - \mu_{\tilde{y},i})$$

Similar to the Kalman Filter 132, when the anomaly score, $a_i > \gamma_i$, error detection module 130 may detect an anomaly using autoencoder 134.

Figure 3:
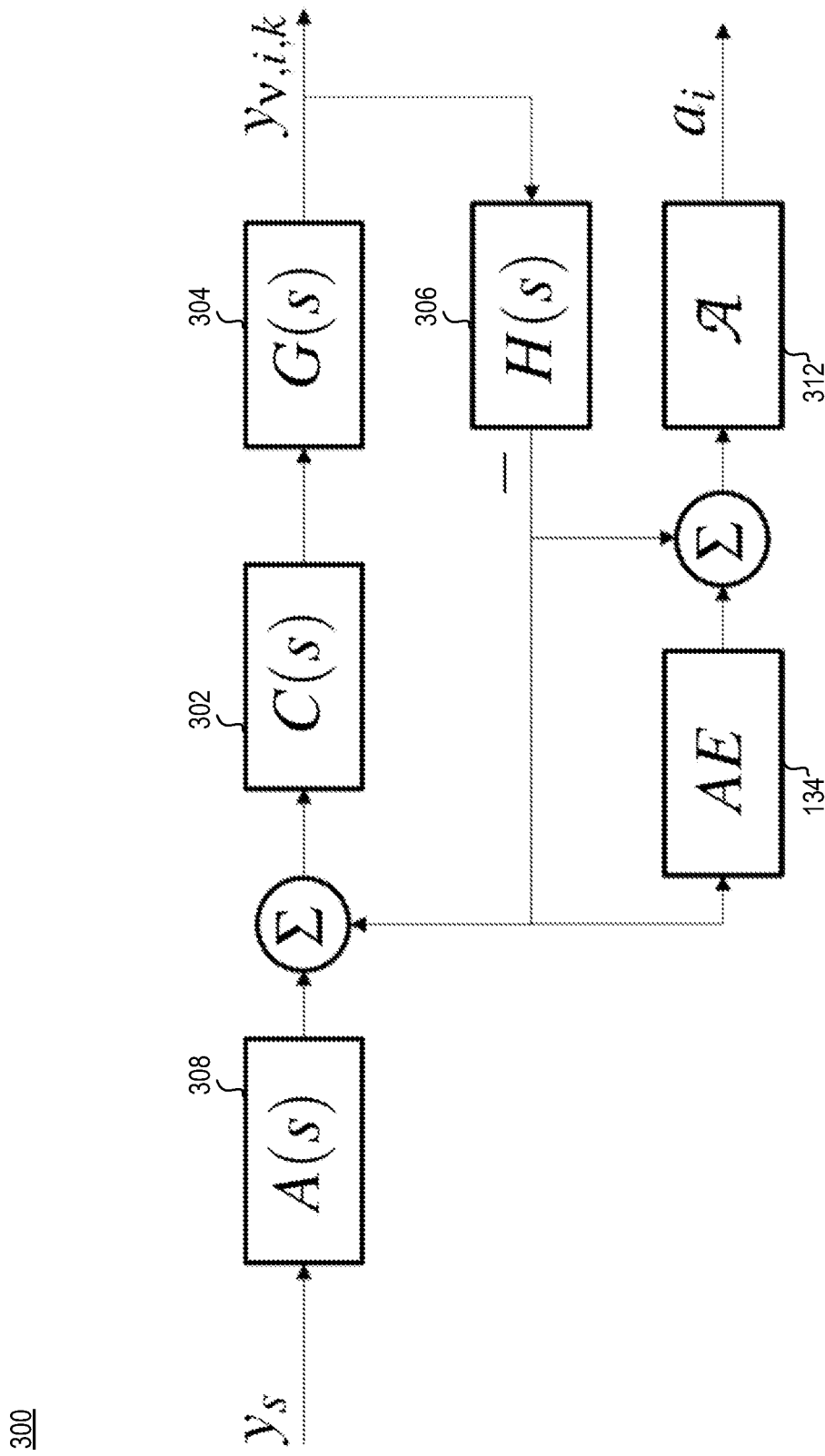
FIG. 3 is a block diagram illustrating architecture of a system implementing autoencoder, according to example embodiments.

FIG. 3 is a block diagram illustrating architecture of a system 300 implementing autoencoder 134, according to some embodiments. As shown, system 300 may include a controller 302 (e.g., C(s)), a plant 304 (e.g., G(s)), a measurement 306 (e.g., H(s)), an attack 308 (e.g., A(s)), autoencoder 134 (e.g., AE), and an alarm 312 (e.g., $\mathcal{A}$). Controller 302, plant 304, and measurement 306 may represent the basic constituents of the nodal control, while autoencoder 134 may detect errors. In some embodiments, error detection module 130 may trigger an alarm 312, based on a sufficient anomaly score.

Referring back to FIG. 1, in some embodiments, error detection module 130 may use one or more deep reinforcement learning techniques to identify an error or anomaly in the processing corresponding to a cyberattack. As provided above, given the definition of damage, $d_i$, a delayed reward function may be formulated for a reinforcement learning agent seeking to construct a set of distributions, $P_{k+1}, \ldots, P_n$, to solve the damage recovery problem of $$\underset{\{P_{k+1}, \ldots, P_n\}}{\mathrm{argmin}} \left\{ \sum_{i=k+1}^{n} D_{KL}(P_i \| Q_i) \right\}$$

through its actions, $\vec{a}_i^j$, for $i = k+1, \ldots, n$, over some set of iterations, $j = 1, \ldots, m$:

$$R(\vec{a}^j) = \sum_{i=k+1}^{n} r_i(\vec{a}_i^j) \text{ for } r_i(\vec{a}_i^j) = P_i(\vec{a}_i^j) \log \frac{P_i(\vec{a}_i^j)}{Q_i(\vec{a}_i^j)}$$

In some embodiments, error detection module 130 may train an agent in an actor-critic modality, such that one network may produce an action, $a_{i,k}$, given a state $\vec{x}_{i,k}$ for the $k^{th}$ sample of the $i^{th}$ node of a process, and another network may generate a prediction of Q-value, $Q_{i,k}^\pi(\vec{x}_{i,k}, a_{i,k} | \theta_{Q,i})$, learned over parameters $\theta_{Q,i}$, where $\pi_i(\vec{x}_{i,k}, \theta_{\pi,i})$ may be a learned policy over parameters $\theta_{\pi,i}$. In some embodiments, the reward may be calculated using a Bellman formulation such that:

$$Q_i(\vec{x}_{i,k}, a_{i,k}) = r_{i,k} + \gamma_i Q_i(\vec{x}_{i,k+1}, \pi_i(\vec{x}_{i,k+1}) | \theta_{\pi,i})$$

In some embodiments, the update law associated with the reinforcement learning technique may be:

$$-\nabla_{\theta_{\pi,j}} J = \mathbb{E}_{a_{i,k} \sim p} [\nabla_{a_i} Q_i(\vec{x}_{i,k}, a_{i,k} | \theta_{\pi,i})]$$

In some embodiments, the update law may reduce or minimize the Q-value, thereby minimizing damage, and may manifest in actions aimed at returning the distribution to its canonical shape. In some embodiments, one formulation of an action may be:

In some embodiments, a formulation of an action may be:

$$u_{i,k} = a_{i,k} u^*_{i,k},$$

where $u_{i,k}$ may be the input of $\dot{\vec{x}}_i = A_i \vec{x}_i + B_i u_{e,i}(t)$ and $y_i(t) = C_i^T \vec{x}_i$, $a_{i,k}$ may be an instruction modifier, and $u^*_{i,k}$ may be the instruction read for a particular sample, k, of node i. If this instruction is corrupted, and that corruption manifests in the states, then policy, $\pi_{i,k}$, may act to correct it.

By utilizing a reinforcement learning approach, error detection module 130 may offer a new way to address system security by bundling process-based malicious cyberattacks into nominal process variations and offers direct control and correction for those variations. The approaches are not simply a method of detection or passive prevention; rather, a cyberattack may be assumed to manifest as a routine (e.g., probable) system variation, such as machine turning out of norm or raw material stock moving out of tight specification.

Figure 4:
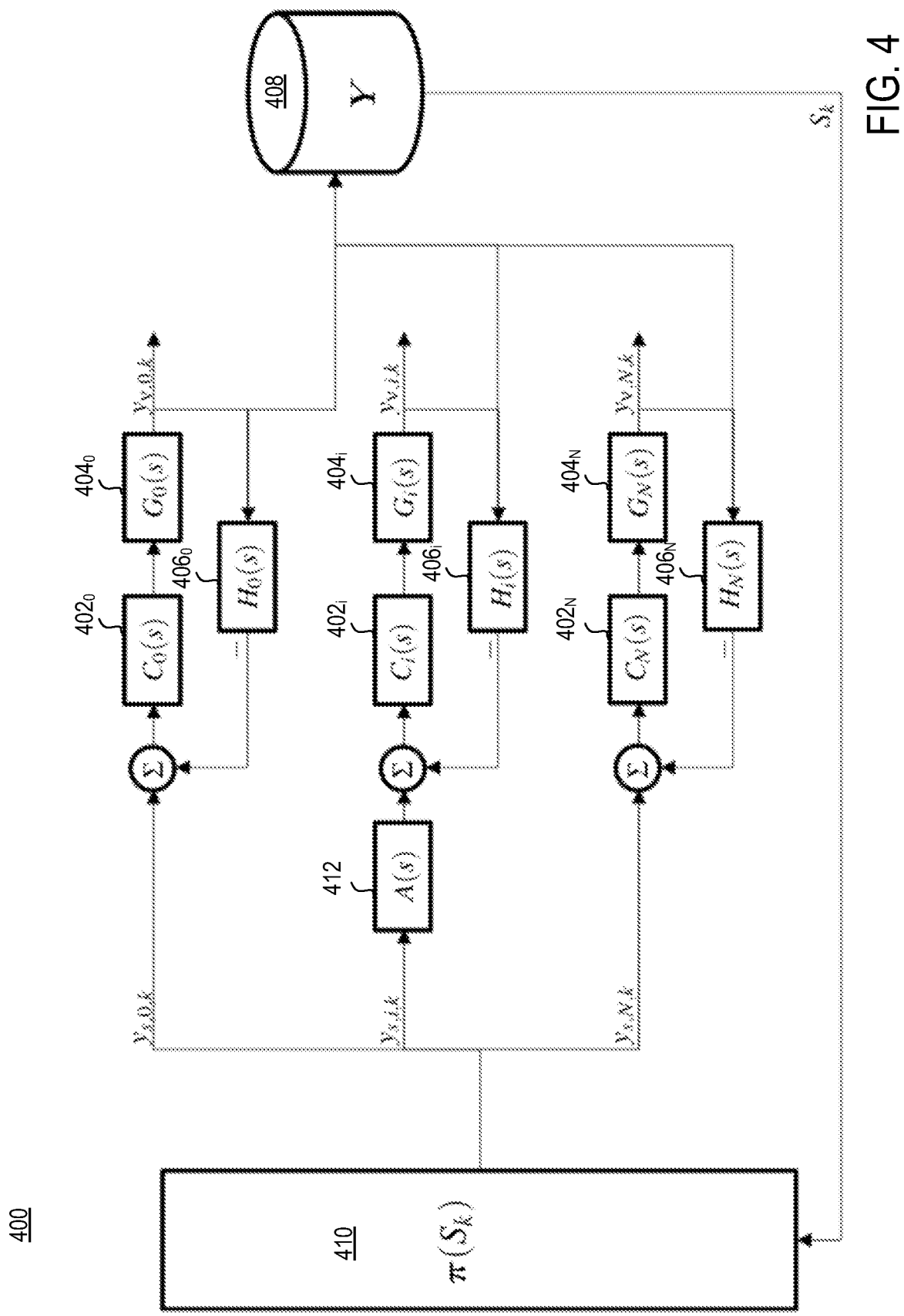
FIG. 4 is a block diagram illustrating architecture of a system implementing a reinforcement learning approach using machine learning module, according to example embodiments.

FIG. 4 is a block diagram illustrating architecture of a system 400 implementing a reinforcement learning approach using machine learning module 136, according to some embodiments. As shown, system 400 may be representative of a multi-node system, i=0, . . . , N. For each node i, there may exist a controller $402_0$, $402_1$, and $402_N$ (e.g., $C_0(s), C_i(s), \ldots C_N(s)$), a plant $404_0$, $404_i$, and $404_N$ (e.g., $G_0(s), G_i(s), G_N(s)$), and a measurement $400_0$, $406_i$, and $406_N$ (e.g., $H_0(s), H_i(s), H_N(s)$). Together, the nodes may be embedded in a policy-learning feedback loop governed by the state of system 400 at time k, $S_k$, sampled from data store 408 (e.g., Y), and the policy taking the current state 410 as input, $\pi(S_k)$. An attack 412 may be represented for a single node, i, by block A(s).

In some embodiments, to identify a set of actions to take to correct the errors caused by a cyberattack, the state, $S_k$, for time sample, k, may be input into a nonlinear filter, whose weights may be chosen to minimize the subsequent damage for a time sample, k+n, given an observed artifact or component. In some embodiments, the output of the filter may be a scalar or vector, which modifies the prescribed process setpoint or control values. The transform from the state to the action may be referred to as the policy.

Figure 5:
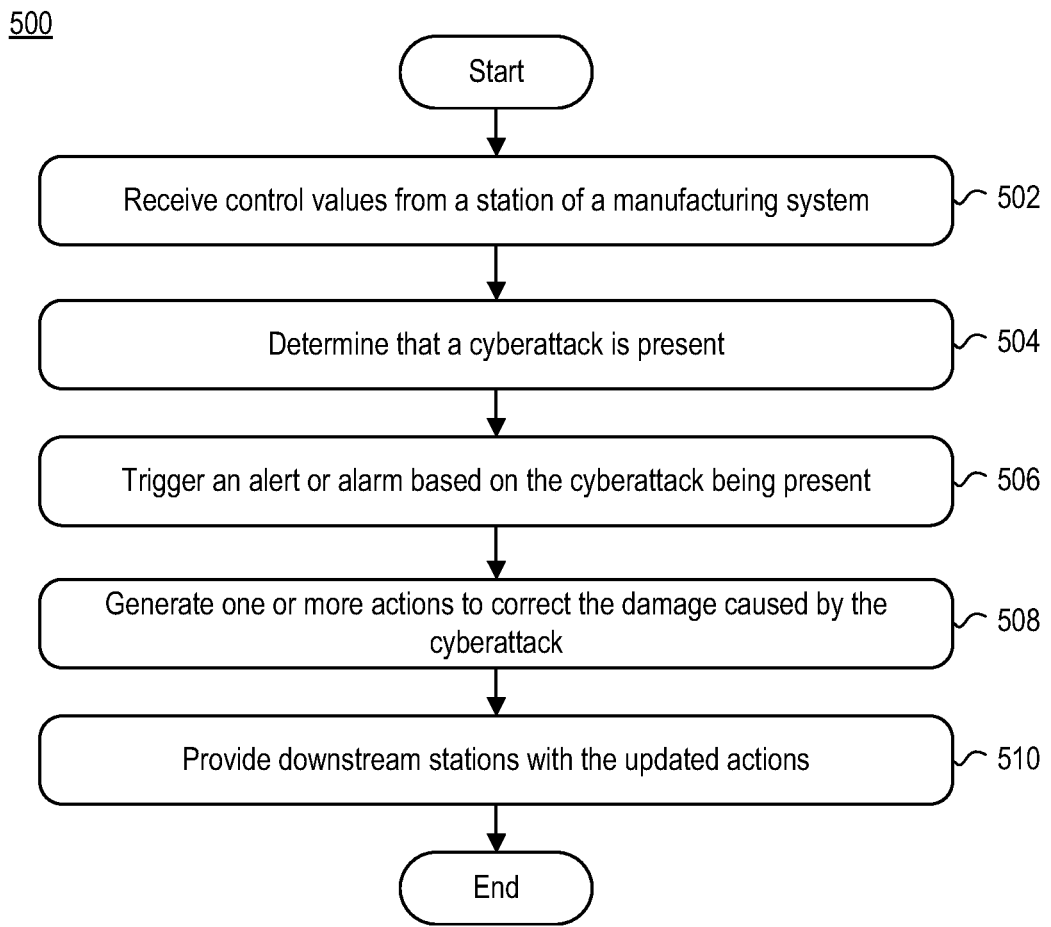
FIG. 5 is a flow diagram illustrating a method of managing a cyberattack to a manufacturing process, according to example embodiments.

FIG. 5 is a flow diagram illustrating a method 500 of managing a cyberattack to a manufacturing process, according to example embodiments. Method 500 may begin as step 502.

At step 502, control module 106 may receive control values from a station 108 of manufacturing system 102. In some embodiments, control module 106 may receive the control values from a process controller associated with a given station 108. The process controller may generally be programmed to control the operations of station 108. Exemplary control values may include, but are not limited to: speed, temperature, pressure, vacuum, rotation, current, voltage, power, viscosity, materials/resources used at the station, throughput rate, outage time, noxious fumes, and the like. More generally, a control value may refer to an attribute of station 108, instead of an attribute of a component being processed by station 108.

At step 504, control module 106 may determine that a cyberattack is present, based on the control values received from station 108. For example, in some embodiments, error detection module 130 may use Kalman Filter 132 to generate an anomaly score for station 108 given the control values. If, for example, the anomaly score is greater than a predefined threshold value, then control module 106 may determine that a cyberattack is currently ongoing. In another example, error detection module 130 may use autoencoder 134 to generate an anomaly score for station 108 given the control values. If, for example, the anomaly score is greater than a predefined threshold, then control module 106 may determine that a cyberattack is currently ongoing. In another example, error detection module 130 may use machine learning module 136 to predict a Q value corresponding to station 108. If, for example, the Q value is outside of a range of acceptable values, then control module 106 may determine that a cyberattack is currently ongoing.

In some embodiments, method 500 may include step 506. At step 506, responsive to determining that a cyberattack is occurring, control module 106 may trigger an alert or alarm. In some embodiments, the alert or alarm may be a notification to a user overseeing manufacturing system 102. In some embodiments, the alert or alarm may be a signal that stops or ceases processing of each station $108_1$-$108_n$ of manufacturing system 102.

In some embodiments, method 500 may include steps 508-510. At step 508, responsive to determining that a cyberattack is occurring, control module 106 may generate one or more actions to correct for the damage caused by the cyberattack. For example, error detection module 130 may train an agent in an actor-critic modality, such that one network may produce an action, $a_{i,k}$, given a state $\vec{x}_{i,k}$ for the $k^{th}$ sample of the $i^{th}$ node of a process, and another network may generate a prediction of Q-value, $Q_{i,k}^{\pi}(\vec{x}_{i,k}, a_{i,k}|\theta_{Q,i})$, learned over parameters $\theta_{Q,i}$, where $\pi_i(\vec{x}_{i,k}, \theta_{\pi,i})$ may be a learned policy over parameters $\theta_{\pi,i}$. In some embodiments, the reward may be calculated using a Bellman formulation such that:

$$Q_i(\vec{x}_{i,k}, a_{i,k}) = r_{i,k} + \gamma_i Q_i(\vec{x}_{i,k+1}, \pi_i(\vec{x}_{i,k+1})|\theta_{\pi,i})$$

In some embodiments, the update law associated with the reinforcement learning technique may be:

$$-\nabla_{\theta_{\pi,i}} J = \mathbb{E}_{a_{i,k}\sim p}[\nabla_{a_i} Q_i(\vec{x}_{i,k}, a_{i,k}|\theta_{\pi,i})]$$

In some embodiments, the update law may reduce or minimize the Q-value, thereby minimizing damage, and may manifest in actions aimed at returning the distribution to its canonical shape. In some embodiments, one formulation of an action may be:

In some embodiments, a formulation of an action may be:

$$u_{i,k} = a_{i,k} u^*_{i,k},$$

where $u_{i,k}$ may be the input of $\dot{\vec{x}} = A_i \vec{x}_i + B_i u_{e,i}(t)$ and $y_i(t) = C_i^T \vec{x}_i$, $a_{i,k}$ may be an instruction modifier, and $u^*_{i,k}$ may be the instruction read for a particular sample, k, of node i. If this instruction is corrupted, and that corruption manifests in the states, then policy, $\pi_{i,k}$, may act to correct it.

At step 510, control module 106 may provide downstream stations 108 with the updated actions generated by machine learning module 136. In some embodiments, control module 106 may transmit updated instructions to process controllers of each downstream station 108.

Figure 6A:
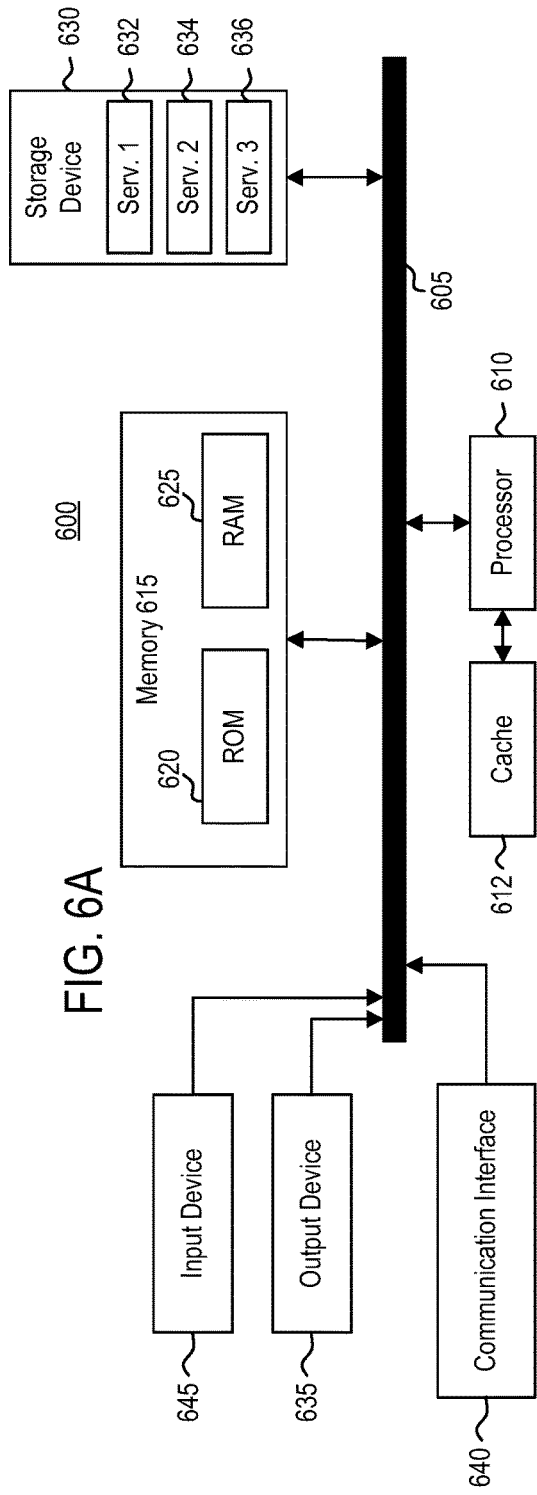
FIG. 6A illustrates a system bus computing system architecture, according to example embodiments.

FIG. 6A illustrates a system bus computing system architecture 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 3 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing device 600, an input device 645 which can be any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with computing device 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, display 635, and so forth, to carry out the function.

Figure 6B:
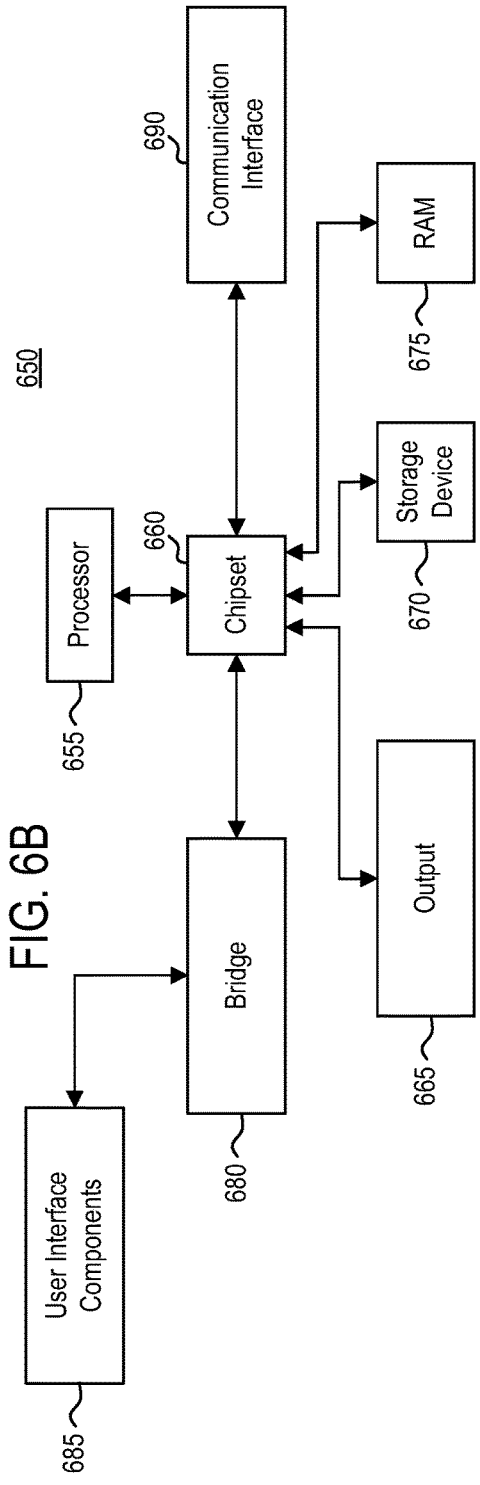
FIG. 6B illustrates a computer system having a chipset architecture, according to example embodiments.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A manufacturing system, comprising:
   one or more stations, each station configured to perform at least one step in a multi-step manufacturing process for a component;

a monitoring platform configured to monitor progression of the component throughout the multi-step manufacturing process; and
a control module configured to detect a cyberattack to the manufacturing system, the control module configured to perform operations, comprising:
receiving control values for a first station of the one or more stations, the control values comprising attributes of the first station;
determining that there is a cyberattack based on the control values for the first station using one or more machine learning algorithms; and
based on the determining, generating one or more actions to correct damage caused by the cyberattack, the generating comprising:
generating a plurality of possible actions to correct the damage caused by the cyberattack, and
identifying the one or more actions from the plurality of possible actions that yields a greatest correction in the damage caused by the cyberattack.

2. The manufacturing system of claim 1, wherein the one or more machine learning algorithms comprise a Kalman Filter.

3. The manufacturing system of claim 2, wherein determining that there is a cyberattack based on the control values for the first station using the one or more machine learning algorithms comprises:
generating, using the Kalman filter, an anomaly score for the first station based on the control values; and
determining that the anomaly score exceeds a threshold value indicative of a cyberattack.

4. The manufacturing system of claim 1, wherein the one or more machine learning algorithms comprise an autoencoder.

5. The manufacturing system of claim 4, wherein determining that there is a cyberattack based on the control values for the first station using the one or more machine learning algorithms comprises:
generating, using the autoencoder, an anomaly score for the first station based on the control values; and
determining that the anomaly score exceeds a threshold value indicative of a cyberattack.

6. The manufacturing system of claim 1, wherein the one or more machine learning algorithms comprise a deep learning algorithm.

7. The manufacturing system of claim 6, wherein determining that there is a cyberattack based on the control values for the first station using the one or more machine learning algorithms comprises:
generating a predicted quality metric for the component based on the control values; and
determining that the predicted quality metric falls outside a range of acceptable values.

8. A computer-implemented method, comprising:
receiving, by a computing system, control values for a first station of one or more stations of a manufacturing system configured to process a component, the control values comprising attributes of the first station;
determining, by the computing system, that there is a cyberattack based on the control values for the first station using one or more machine learning algorithms; and
based on the determining, generating, by the computing system, a set of actions to correct for errors caused by the cyberattack, the set of actions associated with downstream stations of the manufacturing system, the generating comprising:
generating a plurality of possible actions to correct the errors caused by the cyberattack, and
identifying the set of actions from the plurality of possible actions that yields a greatest correction in the errors caused by the cyberattack.

9. The computer-implemented method of claim 8, wherein the one or more machine learning algorithms comprise a Kalman Filter.

10. The computer-implemented method of claim 9, wherein determining that there is a cyberattack based on the control values for the first station using the one or more machine learning algorithms comprises:
generating, using the Kalman filter, an anomaly score for the first station based on the control values; and
determining that the anomaly score exceeds a threshold value indicative of a cyberattack.

11. The computer-implemented method of claim 8, wherein the one or more machine learning algorithms comprise an autoencoder.

12. The computer-implemented method of claim 11, wherein determining that there is a cyberattack based on the control values for the first station using the one or more machine learning algorithms comprises:
generating, using the autoencoder, an anomaly score for the first station based on the control values; and
determining that the anomaly score exceeds a threshold value indicative of a cyberattack.

13. The computer-implemented method of claim 8, wherein the one or more machine learning algorithms comprise a deep learning algorithm.

14. The computer-implemented method of claim 13, wherein determining that there is a cyberattack based on the control values for the first station using the one or more machine learning algorithms comprises:
generating a predicted quality metric for the component based on the control values; and
determining that the predicted quality metric falls outside a range of acceptable values.

15. A manufacturing system, comprising:
one or more stations, each station configured to perform at least one step in a multi-step manufacturing process for a component;
a monitoring platform configured to monitor progression of the component throughout the multi-step manufacturing process; and
a control module configured to detect a cyberattack to the manufacturing system, the control module configured to perform operations, comprising:
receiving control values for a first station of the one or more stations, the control values comprising attributes of the first station;
determining that there is a cyberattack based on the control values for the first station using one or more machine learning algorithms;
based on the determining, generating an alert to cease processing of the component; and
generating, using one or more second machine learning algorithms, a set of actions to correct for errors caused by the cyberattack, the set of actions associated with downstream stations of the manufacturing system, the generating comprising:
generating a plurality of possible actions to correct the errors caused by the cyberattack, and
identifying the set of actions from the plurality of possible actions that yields a greatest correction in the errors caused by the cyberattack.

16. The manufacturing system of claim 15, wherein the one or more machine learning algorithms comprise a Kalman Filter and the one or more second machine learning algorithms comprise a deep learning algorithm.

17. The manufacturing system of claim 16, wherein determining that there is a cyberattack based on the control values for the first station using the one or more machine learning algorithms comprises:
   generating, using the Kalman filter, an anomaly score for the first station based on the control values; and
   determining that the anomaly score exceeds a threshold value indicative of a cyberattack.

18. The manufacturing system of claim 15, wherein the one or more machine learning algorithms comprise an autoencoder.

19. The manufacturing system of claim 18, wherein determining that there is a cyberattack based on the control values for the first station using the one or more machine learning algorithms comprises:
   generating, using the autoencoder, an anomaly score for the first station based on the control values; and
   determining that the anomaly score exceeds a threshold value indicative of a cyberattack.

20. The manufacturing system of claim 15, wherein the one or more machine learning algorithms comprise a deep learning algorithm.

* * * * *